May 14, 1963
R. E. SCHULZE ETAL
3,089,508
CHEMICAL SOLUTION TANK AND MEANS FOR
CONTROLLING CHEMICAL DOSAGE
Filed Oct. 10, 1958
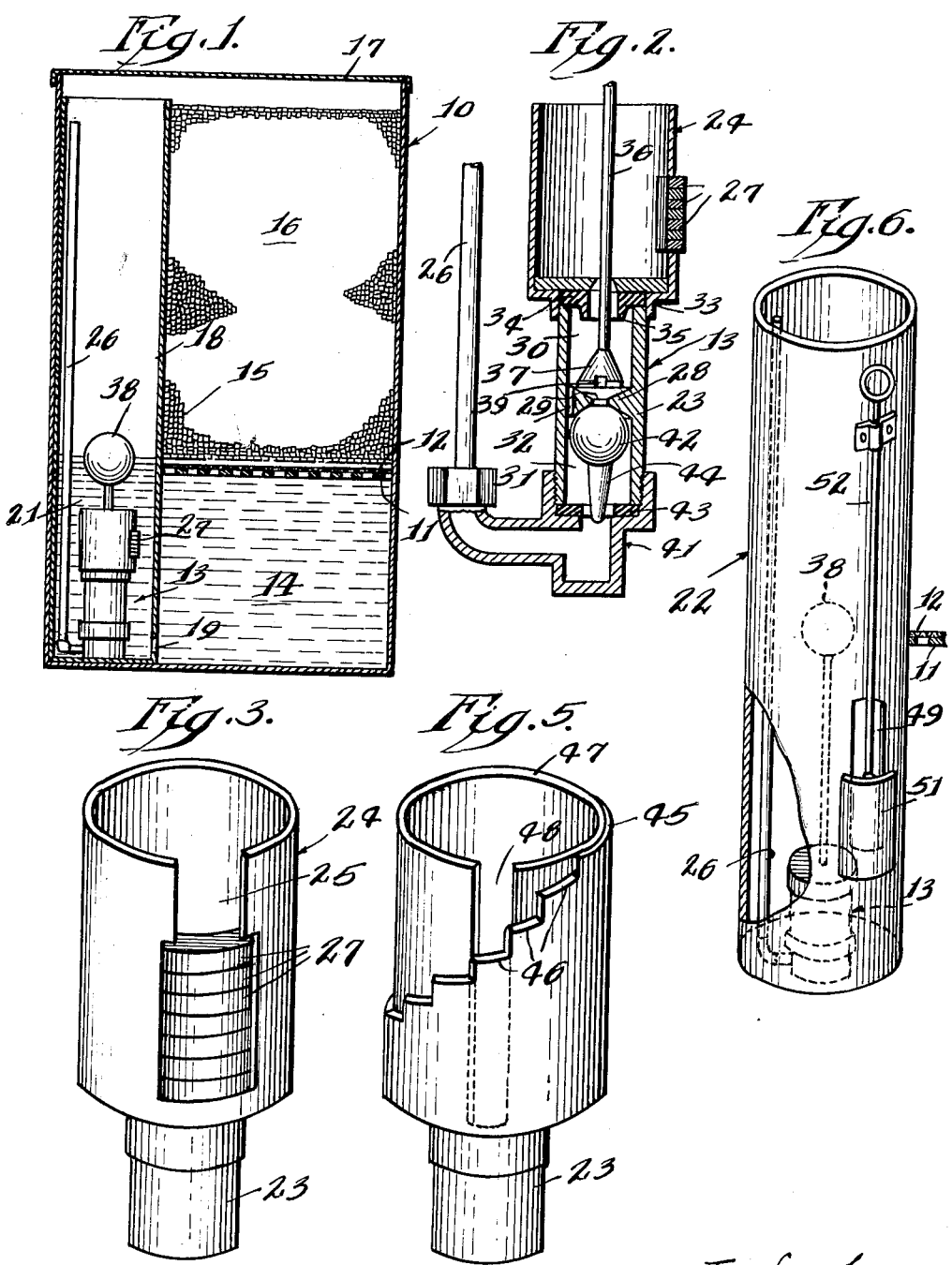
Inventors,
Robert E. Schulze.
Edmund J. Heartstedt.
By Wilson & Geppert
Attorneys.

United States Patent Office 3,089,508
Patented May 14, 1963

3,089,508
CHEMICAL SOLUTION TANK AND MEANS FOR CONTROLLING CHEMICAL DOSAGE
Robert E. Schulze, Deerfield, and Edmund J. Heartstedt, Glenview, Ill., assignors to Culligan, Inc., Northbrook, Ill., a corporation of Delaware
Filed Oct. 10, 1958, Ser. No. 766,564
4 Claims. (Cl. 137—433)

The present invention relates to a novel chemical solution tank and to a novel means for controlling the chemical dosage, and more particularly to a novel system for supplying a predetermined quantity of a regenerant to a water softening or conditioning system.

In the copending application of Schulze and Heartstedt, Serial No. 648,043, filed March 25, 1957, there is disclosed a so-called semi-wet salt storage system for supplying a regenerant to a water conditioning unit, in which only a portion of the total salt dosage is submerged in water or the resulting brine therebelow. The salts available for use in said prior system are generally natural rock salts as mined which contain impurities, although refined salts which are substantially free of impurities are available.

It has been determined that mined rock salt gives better results in said prior system due principally to the fact that the coarser rock salts retain a fairly uniform void volume between the salt particles during operation, and also that there is less tendency for the particles to fuse together due to the humid conditions inherent in the tank. Another advantage arising from the use of rock salt is that it is generally less expensive than refined salt, but rock salt has the disadvantage that impurities are present and due to such inherent impurities the brine or regenerant tank must be cleaned occasionally to maintain the system in proper condition for operation.

In the system disclosed in the recited pending application, the salt dosage is measured as the volume of salt brine contained in the void volume between the particles, with the dosage capable of being varied by changing the liquid level between the top of the brine valve and the float level, and a rather substantial amount of salt is necessarily covered with liquid in said system.

Refined salt capable of working in the semi-wet system is generally formed of briquets which consist of three principal types; (1) a small pellet formed as approximately ½ inch cubes; (2) a salt brick of approximately the size of a common brick; and (3) a salt block weighing approximately 50 pounds and of a size approximately 8 x 8 x 11 inches.

In an endeavor to employ the small pellets in the system disclosed in the pending application, it is found they have a tendency to collapse when submerged in water and, when collapsed, the entire void volume is lost. Also these small pellets have a tendency to fuse together adjacent to the water line under the highly humid conditions encountered. While the above described larger bricks and blocks do not collapse, as they dissolve they become smaller and the resulting change in the void volume is a serious objection to their use in such prior system.

In the present novel system, the problems affecting use of the briquetted refined salt have been successfully overcome by placing this salt upon an elevated, perforated supporting plate or platform whereby only a relatively small portion of the supported salt is in contact with the water therebelow in the brine tank. In this novel system, the portion of the brine tank below the supporting member with its openings or slots is used to store the concentrated brine as the lower portion of the salt of the supported bed is dissolved. This system is generally not suitable for use with rock salt as the impurities, dirt or foreign particles inherent in such mined salt collects and quickly reaches a depth upon the pervious supporting surface whereby it prevents the water therebelow from contacting and dissolving the salt.

Whereas in the system disclosed in the pending application where the salt is not held in elevated position upon a pervious supporting member, the salt dosage or available regenerant for regenerating the contents of the water softening or conditioning unit is measured by the difference between the top of the brine valve and the relative position of the float, in the present novel system the chemical dosage or available brine for each regeneration cycle is measured from slightly above the supporting member down to a variable setting of a weir box or a closed chamber disposed above and opening into the float-actuated valve.

Among the objects of the present invention is the provision of a novel chemical or regenerant system including means for accurately controlling the regenerant or brine solution available for the periodic regeneration or reactivation of a water softener or other conditioning unit.

The present invention further comprehends a novel means and manner of measuring the dosage from a chemical solution tank in which such dosage is measured from slightly above the height of a supporting member down to a variable setting associated with a control valve.

A further object of the present invention is the provision of a novel regenerant system embodying a solution tank provided with a pervious support for supporting thereon in elevated position refined briquets or granules of salt or other soluble granular material of a size incapable of clogging the pervious support and containing substantially no insoluble material, whereby not more than an inch and preferably approximately one-half inch of the supported granular material is contacted by the water therebeneath, the portion of the tank below said support providing a storage space for the concentrated chemical as the granules dissolve.

Another object of the present invention is the provision in a chemical solution tank of an elevated, pervious supporting surface for supporting the chemical to be dissolved, a control valve and means associated with said valve for controlling and measuring the quantity or dosage of concentrated solution made available for periodic use, said control means being adjustable whereby to obtain a variable setting for increasing or decreasing the dosage measured from slightly above the supporting surface down to the adjustable setting on a weir box or solution chamber opening into the valve.

Further objects are to provide a construction of maximum simplicity and efficiency, and such further objects, advantages and capabilities as will later more fully appear and are inherently possessed thereby.

In the drawing:
FIGURE 1 is a view in vertical cross section through a chemical solution tank embodying the present invention, the control valve assembly being shown in side elevation.
FIG. 2 is an enlarged fragmentary view in vertical cross section through the control valve upon the upper end of which is mounted a weir box for controlling the quantity of concentrated solution to be dispensed.
FIG. 3 is a fragmentary enlarged view in perspective showing the front or slotted face of the weir box of FIG. 2 and its variable setting for controlling the quantity of concentrated solution to be dispensed through the control valve.
FIG. 4 is a fragmentary top plan view of the weir box of FIG. 3 and showing one manner in which the removable and adjustable segments of the closure are removably mounted and retained in the vertical slot of the box.
FIG. 5 is a view similar to FIG. 3 but showing an alternate form of weir box consisting of two concentrically mounted and relatively rotatable tubular members conformably fitting together in substantial sealing contact, one of which is provided with a vertical slot and the other having a stepped or staggered opening adjustable relative to the vertical slot for controlling the depth and measuring the quantity of concentrated solution to be dispensed.

FIG. 6 is a perspective view of a further alternate construction of control means in which the control valve is contained within an encompassing tubular chamber in the solution tank, said chamber having a vertical slot intermediate its ends and an adjustable closure for varying the effective height of the slot and thereby controlling the quantity of concentrated solution to be dispensed.

Referring more particularly to the disclosure in the drawing, the illustrative embodiment is shown as comprising a chemical solution tank 10 having a perforated or slotted supporting surface such as a plate, grid or other member 11 elevated from the bottom, a screen or foraminous sheet 12 overlying said supporting member, a float-actuated valve assembly 13 mounted on and at one side of the base of the tank, and means associated with said valve assembly for measuring the quantity of concentrated chemical solution 14 to be dispensed.

Upon the screen 12 and supporting member 11 is placed a bed 15 of briquets or granules of salt or other soluble granular or crystalline material containing substantially no insoluble material and capable of forming a concentrated chemical solution or brine below the supporting member. These briquets or granular materials should be sufficiently large so as not to clog the openings in the screen 12 or the pervious supporting member 11 and should be sufficiently refined as to be substantially free of insoluble matter that may clog the openings of these members.

The storage space 16 above the supporting member 11 is capable of holding sufficient briquets or granular material for repeatedly preparing and supplying a required dosage of a concentrated chemical solution. Thus it is intended that this space be filled or substantially filled with such soluble material and, when the occasion requires, being readily refilled upon removal of the cover 17.

The valve assembly 13 is shown encompassed by an enclosure 18 of suitable height (FIG. 1), extending to the bottom of the tank 10 and provided with an opening 19 for the entrance of water or liquid into the tank for forming the chemical solution and through which the formed or resulting solution exits into the chamber 21 in which the valve assembly is mounted, or a tubular enclosure 22 (FIG. 6) mounted upon and projecting upwardly from the bottom of the tank and about the valve assembly with the lower end of the enclosure sealed against the passage of the liquid or solution to and from the valve assembly. Actually, the enclosure 18 need project only to and not below the supporting surface 11.

With reference to FIGS. 1, 2 and 3, the valve assembly 13 comprises a valve body 23 to the upper end of which is affixed an open receptacle or weir box 24 provided with a vertical slot 25 for the passage of liquid into and out of the chamber 21 encompassing this receptacle. The slot 25 controls the solution dosage or quantity of solution to be withdrawn for use. As disclosed in the above mentioned copending application Serial No. 648,043, the chemical solution may be a concentrated brine periodically withdrawn through the valve body 23 and its connected conduit 26 into a water softening or conditioning unit when regeneration or reactivation is required or desired. However, a chemical solution so produced may be withdrawn for any use to which it is susceptible.

The quantity or dosage withdrawn through the slot 25 and through the valve body 23 is measured by the height of the opening in the slot and the depth of solution thereabove, and this may be readily varied by the insertion or removal of one or more segments 27 forming a partial closure for the slot with each segment so contoured as to fit conformably in the slot in abutting and sealing relation. Thus adding segments 27 decreases the quantity of chemical solution that may be withdrawn and the removal of segments 27 increases the quantity to be dispensed, the dosage being that quantity of the concentrated solution disposed slightly above the fixed supporting plate 11 downward to a liquid level controlled by varying the effective height of the slotted opening.

The interior of the hollow body 23 of the valve assembly is provided with a transverse wall 28 intermediate its ends with the opposite faces of this wall inclined or dished to a central port 29 communicating between an upper chamber 30 and a lower chamber 31. A by-pass 32 is also provided in the transverse wall 28 to form an open and unobstructed but restricted passage between the upper and lower chambers.

The cap or cover 33 at the upper end of the valve body 23 may also form the base of the weir box 24 and is provided with a ported gasket 34 having a depending annular lip 35 through which projects a valve stem or rod 36 to the lower end of which is affixed a tapered valve member 37 and to the upper end of which is affixed a float 38 for controlling the opening and closing of the valve member 37. The enlarged base or lower surface of the valve member is provided with diametrically arranged slots 39 whereby when the valve stem 36 and valve member 37 are lowered to seat the latter upon the upper surface of the ported transverse wall 28, liquid entering the valve body through the opening in the gasket 34 may exit through the slots 39 and port 29, through the communicating passage in the base 41 of the valve assembly and the connected conduit 26 for use.

In the lower or air check chamber 31 of the valve body is provided a ball valve 42 preferably of a buoyant material, such as a plastic or other composition unaffected by the chemical solution and capable of seating and closing the opening in a gasket 43 leading to the passage in the base 41 when the ball valve 42 is lowered upon dispensing the measured quantity of concentrated solution. This ball valve 42 when elevated to the position shown in FIG. 2 by the entering liquid supplied to replenish the dispensed solution and form a new solution, closes the port 29 in the transverse wall 28 but permits the flow of this entering liquid through the substantially smaller by-pass 32. As the ball valve 42 has a specific gravity less than that of the dissolving liquid and is thus buoyant, it does not sink in the liquid but is raised to elevated position by the entering liquid through the conduit 26 when the liquid supply is replenished.

Assuming the chemical solution is withdrawn by suction, it is comprehended that the distance between the transverse wall 28 and the gasket 43 is such that as the upward force due to the buoyancy of the ball valve 42 is greater than the downward suction force, the ball valve does not seat to close off the opening in the gasket 43 until the measured quantity of the solution has been exhausted, whereupon the ball valve seats and prevents air from being then withdrawn.

When liquid flows into the solution tank to replenish the supply necessary to form the solution, the ball valve 42 is up so that this liquid under line pressure can only flow through the by-pass 31 whereby to slow down the flow. This prevents a jet stream from entering the upper chamber 30 and cause a premature lifting of the float valve member 37 and its float 38.

To maintain the ball valve 42 in vertical position and prevent free rotation thereof, it is provided with a tail or locating projection 44 depending through the opening in the gasket 43 and into the connected passage in the base 41.

In FIG. 5 is disclosed an alternate construction of weir box or receptacle comprising an outer tubular part 45 mounted upon the upper end of the valve body 23 and having a stepped contour at 46. Rotatably and adjustably mounted within and in substantial sealing contact with the outer part 45 is an inner concentric tubular part 47 having a vertical slot 48. Thus by rotating the inner tube 47 relative to the outer, the effective height of the weir may be adjusted. As in the embodiment of FIGS. 1, 2 and 3, the quantity of chemical solution to be periodically dispensed is that quantity of concentrated liquid from slightly above the supporting member 11 and its screen 12 down to the adjusted and effective height of the slot 48.

In the alternate embodiment of FIG. 6, there is disclosed the tubular enclosure 22 extending to the bottom of the tank 10 and providing a brine valve chamber. Unlike the receptacles or weir boxes shown in detail in FIGS. 3 and 5 which are mounted on the valve body 23, the enclosure 22 encloses and surrounds the valve assembly 13. Intermediate its length or height the enclosure 22 is provided with a vertical slot 49 having a conforming and slidably mounted closure 51 capable of varying the effective height of the slot by means of a control rod 52, whereby the closure may be raised or lowered to control passage of the chemical solution through the slot into the solution chamber. While the closure 51 is shown as vertically movable, the effective height of the slot 49 may be varied and controlled by a rotatable closure in a manner similar to FIG. 5. In this embodiment (FIG. 6) of the dosage control means, as in the embodiments of FIGS. 3 and 5, the quantity of solution to be periodically dispensed is that collected from slightly above the fixed supporting surface 11 down to a liquid level controlled by varying the height of the discharge slot 49.

In actual practice, the quantity of liquid supplied to the storage tank extends preferably to slightly above the supporting surface 11 (approximately one inch or less). The storage space is of substantial capacity and capable of storing a large quantity of the briquets of salt or other chemical composition and to which may be added a sterilizing agent, sufficient for repeatedly and periodically supplying a regenerant or chemical solution for a substantial period of time.

In each of the embodiments disclosed, water or liquid to form the chemical solution is supplied through the conduit 26, base 41 and body 23 of the valve assembly, and through the open weir boxes (FIGS. 3 and 5) or slot 49 in the enclosure 22 (FIG. 6) and passes therefrom into the tank and space below the pervious supporting surface 11 to form a new measured quantity or dosage of the chemical solution. The liquid level is controlled by the float 38 to a depth of approximately one inch or less above the supporting surface 11.

When the measured quantity of the chemical solution is being dispensed, the valve member 37 is lowered whereby the solution exits through the weir box or brine chamber, through the valve body and conduit 26 until the level of the solution reaches the setting of the open slot 25, 48 or 49. At such time, the valve member 37 and its float 38 are lowered from the position shown in FIG. 1 to that of FIG. 2, and when the last of the solution entering the valve body has been dispensed, the ball valve 42 seats to close the port in the gasket 43 to prevent air from being exhausted.

As disclosed in the above copending application, after the chemical solution has been exhausted, water or liquid is supplied to the tank 10 through the conduit 26, through the valve body 23, out through the weir boxes or slot 49 of the enclosure 22, and into the space below the pervious supporting surface 11 to fill the tank to the predetermined depth to form a new solution. When filled, the float-actuated valve 37 is elevated to closed position and the ball valve 42 remains elevated by the water or liquid in the valve body. When suction is next applied through the conduit 26 to withdraw the concentrated solution, as by means of an eductor, the valve 37 is lowered to dispense the chemical solution from the tank in the manner described.

Having thus disclosed the invention, we claim:

1. A system for controlling dosage from a chemical solution tank, comprising a storage tank, an enclosure in said tank and communicating with the tank, a conduit extending from the top of the tank to the bottom of the enclosure, a control valve at the bottom of said enclosure and communicating with said conduit, a float valve operatively connected with said valve to limit the maximum liquid level in the tank, and a weir box mounted on said valve to control the minimum liquid level in the tank and thereby control the dosage withdrawn from said tank, said weir box comprising a cylindrical side wall having an upper open end and an elongated vertical slot along the side and extending to the top thereof, and plural vertically stacked curved segments conforming to the cylindrical contour of the weir box and received in aligned relation in said slot to vary the effective height of the slot and thus vary the minimum liquid level in the tank.

2. A system for controlling dosage from a chemical solution tank as set forth in claim 1, in which said segments are generally rectangular and have channels in opposite edges for sliding engagement with the edges defining the vertical slot, said segments being stacked in abutting and sealing relation in said slot.

3. A system for controlling dosage from a chemical solution tank, comprising a tank, a conduit extending from the top of the tank to the bottom thereof, a valve unit mounted on the bottom of the tank and connected at its lower end to said conduit, said valve unit including a valve body and a float-actuated valve projecting downwardly through a port in the top of said valve body and into the latter to control the passage of liquid through said valve unit and limit the maximum liquid level in the tank, and a cylindrical weir box mounted on the top of said valve body and communicating with the port in the top of the valve body, said weir box having an open top and an elongated vertical slot along the side and extending to the open top, and plural vertically stacked curved segments in abutting and sealing relation in said slot to vary the effective height of the slot and control the minimum liquid level in the tank.

4. A system for controlling dosage from a chemical solution tank as set forth in claim 3, in which a cylindrical enclosure is positioned in the tank and encompasses the conduit, valve unit and weir box, said enclosure having at least one opening adjacent the bottom thereof communicating with the storage tank.

References Cited in the file of this patent

UNITED STATES PATENTS

| | | |
|---|---|---|
| 11,675 | Middleton | Sept. 12, 1854 |
| 1,054,533 | Greiber | Feb. 25, 1913 |
| 1,246,394 | Colby | Nov. 13, 1917 |
| 1,321,513 | Eaton | Nov. 11, 1919 |
| 1,975,749 | Lang | Oct. 2, 1934 |
| 2,744,868 | Harting | May 8, 1956 |
| 2,820,419 | Albertson | Jan. 21, 1958 |
| 2,860,488 | Johnson | Nov. 18, 1958 |
| 2,891,574 | Dahlberg | June 23, 1959 |
| 2,895,810 | Casey et al. | July 21, 1959 |
| 2,920,644 | Schulze et al. | Jan. 12, 1960 |
| 2,935,081 | Kryzer | May 3, 1960 |